(12) United States Patent
Ben-Porath (10) Patent No.: US 9,591,478 B2
(45) Date of Patent: Mar. 7, 2017

(54) MOBILE PERSONAL SECURITY SYSTEM

(71) Applicant: RUOK LTD., Herzliya (IL)

(72) Inventor: Tamar Ben-Porath, Herzliya (IL)

(73) Assignee: RUOK Ltd., Herzeliya (IL)

( * ) Notice: Subject to any disclaimer, the term of this patent is extended or adjusted under 35 U.S.C. 154(b) by 0 days.

(21) Appl. No.: 14/923,793

(22) Filed: Oct. 27, 2015

(65) Prior Publication Data

US 2016/0049068 A1    Feb. 18, 2016

Related U.S. Application Data

(63) Continuation-in-part of application No. 14/294,758, filed on Jun. 3, 2014, now abandoned.

(60) Provisional application No. 61/831,670, filed on Jun. 6, 2013.

(51) Int. Cl.
| | |
|---|---|
| *G08B 25/01* | (2006.01) |
| *H04W 12/00* | (2009.01) |
| *G06F 21/31* | (2013.01) |
| *G06F 21/30* | (2013.01) |
| *H04W 12/08* | (2009.01) |
| *H04W 4/02* | (2009.01) |
| *H04W 4/22* | (2009.01) |
| *H04W 88/02* | (2009.01) |

(52) U.S. Cl.
CPC .......... *H04W 12/00* (2013.01); *G06F 21/305* (2013.01); *G06F 21/313* (2013.01); *H04W 4/027* (2013.01); *H04W 4/22* (2013.01); *H04W 12/08* (2013.01); *H04W 88/02* (2013.01)

(58) Field of Classification Search
CPC .......... G06F 21/00; G06F 21/10; G06F 21/30; G06F 21/305; G06F 21/31; G06F 21/313; G06F 21/42; G06F 21/44; H04W 12/00; H04W 12/02; H04W 12/06; H04W 12/08; H04W 12/10; H04W 12/12; G07C 9/00857; G07C 2009/00865; G07C 2009/00873; G07C 2009/00888; G08B 25/01; G08B 25/016
See application file for complete search history.

(56) References Cited

U.S. PATENT DOCUMENTS

| | | | | |
|---|---|---|---|---|
| 5,148,159 | A * | 9/1992 | Clark ................ | G07C 9/00182 340/12.28 |
| 8,862,092 | B2 | 10/2014 | Reitnour | |
| 2008/0040265 | A1 | 2/2008 | Rackley, III et. al | |
| 2010/0317374 | A1* | 12/2010 | Alpert ................ | H04W 68/02 455/458 |

(Continued)

OTHER PUBLICATIONS

US Office Action for U.S. Appl. No. 14/294,758, mailed on Jul. 20, 2015.

*Primary Examiner* — Van Trieu
(74) *Attorney, Agent, or Firm* — Pearl Cohen Zedek Latzer Baratz LLP (57) ABSTRACT

A mobile personal security device, system and method to accept an activation signal of the system on a mobile device. An input of a periodicity setting is also accepted to indicate one of a series of time periods during which the system expects a security code to be inputted into the device. If the code is inputted into the device during one or each interval, then the interval is reset to expect a further inputting of the code during a subsequent interval. If the code is not received, an alarm signal may be issued.

20 Claims, 6 Drawing Sheets

(56) References Cited

U.S. PATENT DOCUMENTS

2011/0076946 A1\* 3/2011 Hillebrand .......... G06F 19/3418
455/41.2
2013/0196601 A1 8/2013 Bobrow et al.
2013/0231077 A1 9/2013 Cahill
2014/0026187 A1\* 1/2014 Johnson .................. G06F 21/53
726/3

\* cited by examiner

Fig. 8

MOBILE PERSONAL SECURITY SYSTEM

CROSS REFERENCE TO RELATED APPLICATIONS

This application is a continuation-in-part of U.S. patent application Ser. No. 14/294,758, filed on Jun. 3, 2014, and entitled 'MOBILE PERSONAL SECURITY SYSTEM, which claimed the benefit of prior U.S. Provisional Patent Application No. 61/831,670, filed on Jun. 6, 2013, and entitled "MOBILE PERSONAL SECURITY SYSTEM, all of which are incorporated in their entirety herein by reference.

SUMMARY OF THE INVENTION

Embodiments of the invention may include a method for implementing a personal security monitoring system using a mobile device. The mobile device may receive an activation signal to for example turn on the personal security monitor, and may receive a selection of a periodicity setting for one or more time periods or time intervals during each of which a user may input a security signal input to the mobile device. If the user inputs the security signal during one or more of such intervals, the interval may be reset in accordance with the periodicity interval setting. If the proper security code is not input to the device during an interval, an alarm may be issued.

In some embodiments, one or more location coordinates may be input or derived and an embodiment of the system may be automatically deactivated when the mobile device arrives at the location coordinate.

In some embodiments, issuing an alarm may include wirelessly transmitting an alarm signal from the mobile device to a remote receiver or server.

Some embodiments may wirelessly transmit a location coordinate of the mobile device to a remote server if the security input signal is not input to the mobile device within a periodicity interval.

In some embodiments, issuing an alarm may include issuing an alarm from the mobile device such as an audible alarm and a visual alarm.

In some embodiments, an alarm signal may be issued if the device fails to arrive at a pre-designated location prior to certain time.

Some embodiments may include issuing an alarm signal upon or in response to an input to the mobile device of an alternate security input signal.

In some embodiments, a mobile device may, at certain times, such as a time near, right before or right after an end of a periodicity interval or duration, issuing an audible signal to remind a user to input a security code.

In some embodiments, an alarm may include or be associated with capturing an image with an imager of the mobile device. In some embodiments, an alarm may include or be associated with recording ambient sound with a microphone of the mobile device.

In some embodiments, an alarm signal may be issued only if a security code has not been inputted into the mobile device for or during more than one periodicity interval.

In some embodiments, an alarm signal may be issued upon or in response to a cessation of one or more functions of the mobile devices, if there is a detection of a loss of connectivity by the device with a wireless communication network, or if a power source of the device is low.

In some embodiments, an alarm signal may be issued by a remote server unless the signal associated with the security input signal is received at the remote server.

Embodiments of the invention may include a system for mobile security monitoring, where the system uses a housing that encompasses a memory, an input device, an audio output device, a visual output device, a wireless transmitter, a wireless receiver and a processor. The processor may be configured perform methods as discussed herein, for example to receive an activation signal for the security monitoring device, to receive a periodicity interval setting for inputting a security signal to the mobile device, to reset (e.g., change the duration of each interval) a periodicity interval period if the security input signal is input to or received by the device within a periodicity interval, and to issue an alarm signal if the security input signal is not input to or received by the device within the periodicity interval period.

In some embodiments, the housing may include a geographic location sensor, and the device may record a location coordinate and a time associated with the location coordinate, and may issue an alarm if the device fails to arrive at the location prior to the pre-defined time.

Embodiments of the invention may include a method of selecting an alarm to be issued from a personal security system in a mobile device. An embodiment may issue at least one of an audible alarm signal and a visible alarm signal from the mobile device if a first personal security signal is not input to the device within a pre-defined time interval; and may issue only an alarm signal that is inaudible and invisible (e.g., cannot be heard by or seen by humans unaided by devices, receivers, etc.) if a second personal security signal is input to the mobile device within the pre-defined time interval. In such later case only an invisible alarm signal may be issued, for example wireless to a remote server.

In some embodiments a device may display a request to input at least one of the first person security signal and a second personal security signal.

Some embodiments of the present invention provide a device, system and method for personal security purposes. According to some embodiments of the present invention, a mobile application for personal security purposes may be connected to a server. The application may have a plurality of operation modes. For example, according to some embodiments, the mobile application may have two basic modes of operation: "walk me"—while user is moving and "guard me"—while user is staying at a fixed location. Other names may be used.

According to some embodiments the personal security device and system may include a portable communication or computing device having a positioning device (e.g. PROVIDE EXAMPLE, LIKE GLOBAL POSITIONING SYSTEM), and adapted to communicate with a server to provide location based information and alerts to an Emergency Call Center (ECC), operate an imaging system of the portable device to obtain images and send them to the server via a network, set an alarm and play a recorded notice when an indication of an emergency is received from a user.

A method according to one embodiment comprises initiating a personal security application on the portable device, providing a fixed location of a user or locating a user and tracking the user's location via a positioning device, translating the received position or positions to an address or a route of the user, and upon or in response to indication of emergency, automatically call or initiate a telephone call or communications session with an ECC, initiate an alarm, play a recorded notice and/or obtain images, via a front and/or rear imagers of the portable computing or communication device and send the images to a remote server via a communication network

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution by for example one or more processors results in a method of an embodiment of the invention. In some embodiments, one or more components of a system may be associated with other components by way of a wired or wireless network. For example one or more memory units and one or more processors may be in separate locations and connected by wired or wireless communications to execute such instructions.

As used in this application, and in addition to its regular meaning, a telephone call may in addition to its regular meaning, include or refer to a call made over a switching network, a Global System for Mobile Communications (GSM), 3G, 4G, LTE/LTE advanced or other cellular network, wired or wireless communication networks.

As used in this application, and in addition to its regular meaning, the term 'call' may refer to standard cellular telephone call or to a voice over IP call, to a message such as an SMS, chat or other message on a messaging service.

As used in this application, and in addition to its regular meaning, the term 'alarm' may refer to an audible, visible, tangible, electronic or other detectable indication of alert that may be produced by a device, several devices or a person or that may be in the form of a signal or sequence of signals issued by the device or some other device to call upon other individuals or devices to take some action or issue some signal in response to the alarm. By way of example, an alarm may include a noise or light produced by a device, a recorded message issued by a device, a call for help from other devices or individuals that may be issued by a device or by some other person or devices who may receive a signal, a capture, storage and transmission of one or more images, series of images or video from one or more cameras, or some combination of the above. An alarm signal may include a siren or other recorded sound as may be selected or recorded by a user, a telephone call to a friend or security provider, an SMS or other message or some other signal that may be issued. An alarm signal may include one or a series of several signals that may be issued for example by a device and transmitted over a wireless network to one or more other devices which may issue one or more further alarm signals. Thus, an alarm signal may be a first or part of a series of actions, measures or functions that are implemented in response to an event or to a failure to take an action. An alarm may implement one or more of such functions or responses. In some embodiments, the processes or series of functions activated upon or in response to the issuance of an alarm may be programmable or selected by a user, and implemented or activated with for example a click or press of an icon on a screen or other activation signal. In some embodiments, an alarm signal may be issued from a device to a remote processor, and may not include a signal that is audible or visible in an area of a mobile device that is part of a mobile security monitoring system.

As used in this application, and in addition to its regular meaning, the term 'periodicity interval' may refer to one or more of a series of time periods or events, such as for example, every one, five or ten minutes, every hour, once per hour, at a designated time or at some other point or series of repeating points or time periods as may be set by a user or as may be automatically implemented. In some embodiments, the periodicity intervals may include only one time, such as upon reaching 9 PM or at some other time. In some embodiments, a periodicity interval may include designated intervals during the period that a system is or remains activated. In some embodiments, a periodicity interval may be or include a distance interval, and or may refer to a geographic location such as an arrival or passing of a device at a certain geographical location, such as every block or when the device passes a certain designated block or location. In some embodiments a periodicity interval may include a combination of time and location, such as deriving a calculation, whether made by the user or automatically by the system, of an estimated time when a user or device will reach one or more locations based on a significance of such location (a bad neighborhood) or an estimated velocity of the user's travel and a time of reaching one or more geographic points (such as the user walks a block in 5 minutes).

According to some embodiments of the present invention, a mobile application for personal security purposes is presented. The mobile application may be connected to a server, e.g. via a cellular, wireless or any other communication network The application may have a plurality of operation modes. For example, according to some embodiments, the mobile application may have two basic modes of operation: "walk me"—while user is moving and "guard me"—while user is staying at a fixed location.

Figure 6:
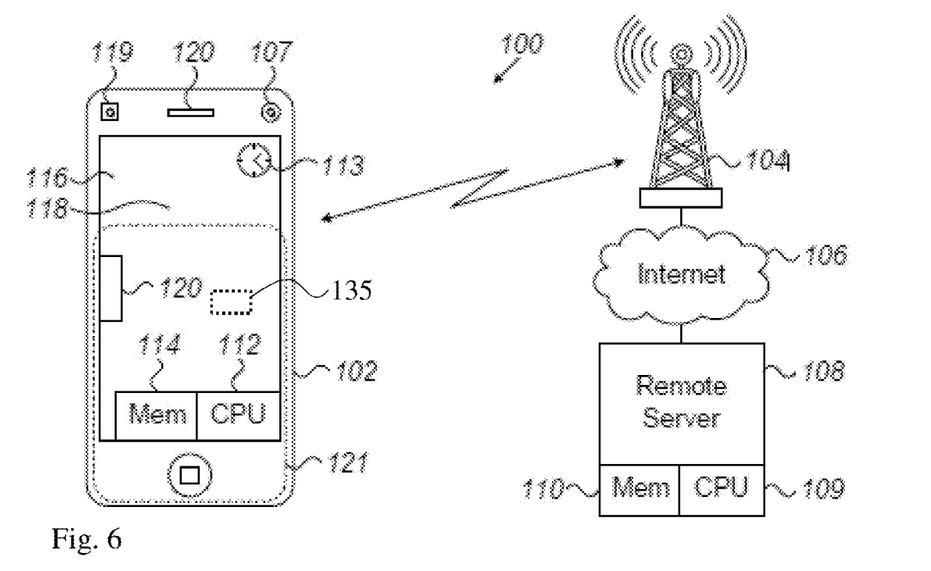
FIG. 6 is a schematic drawing of a system in accordance with an embodiment of the invention.

According to some embodiments the "walk me" status may have a location-based functionality Once operated, the location of the handset or any other portable device, such as a smartphone, tablet computer and the like, may be shown (e.g. recorded, presented and/or saved) at the server, such as server 108 in FIG. 6, and "translated" to a specific address if can be identified by a mapping application such as Google Maps™.

Figure 1:
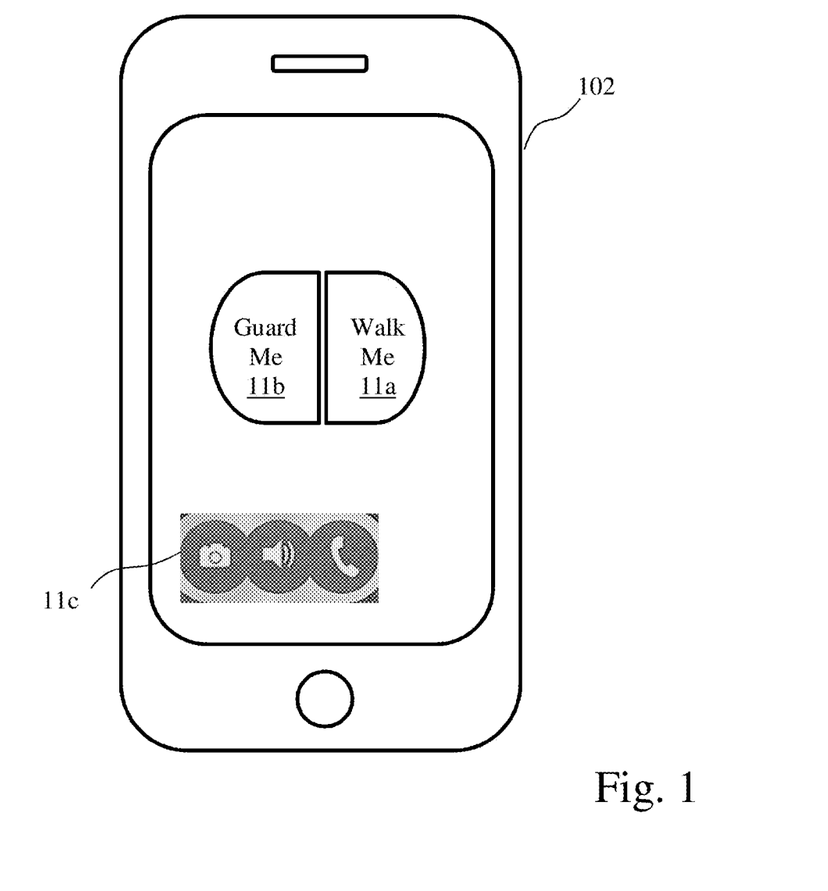
FIG. 1 is an exemplary illustration of a portable device displaying the main screen of mobile application according to embodiments of the present invention.

As seen in FIG. 1, according to some embodiments the mobile application may enable using the handset, such as mobile device 102, as a location based emergency button. For example, by a single click the application may activate functionalities to deter a potential attacker. Additionally, the mobile application may allow connecting a user by, for example, one single click, to an emergency call center. According to a different set of rules, the mobile application may send (for example via e-mail or SMS, or other message systems) different messages to the emergency call center to describe the user's current emergency status. The mobile application may also allow, according to some embodiment, the user, while in motion, to activate "check in" status (also referred to as RuOK Alert status), by which the emergency center may get a notice of emergency status, even if the user was unable to contact the emergency call center, by for example, clicking a button or icon on mobile device (such as mobile device 102).

Download and Registration Process

In some embodiments, following the free download of the mobile application to the user's handset, such as mobile device 102, the user may get access to the Alarm Siren functionality (In other embodiments an app or application need not be used.) In order to activate the services that are related to the Emergency Center (location based services, call and notifications to Emergency Center), certain functionalities within the Alarm service such as recorded message and photos and the RuOK alert status (such services are collectively referred to as "Premium Services"), the user may need to complete a registration process by which the user will insert, for example, the following details:

full name ,
cellular number ,
OK password (PW)—2 digits
Emergency PW—2 digits (optional)
Identification code (4-8 letters; for example name of a country)—to enable the Emergency Call Center (ECC) to verify the identity of the user while calling to the Emergency Center.
Emergency code (4-8 letters; for example name of a city) (optional)—while calling the Emergency Center, the user can identify himself with Emergency code, which will indicate to the Emergency Center that the user is under danger .
Fixed address 1 for "walk me" status (optional)
Fixed address 2 for "walk me" status (optional)
Time interval for RuOK Alert status (optional)

Other information may be used. According to some embodiments, all or some of the details inserted during the registration process may be sent to and saved at server 108 (in FIG. 6).

Manner of Operation

Following the successful completion of the registration process, the user can activate the Premium Services.

As seen in FIG. 1, each time the application is activated, the user may be requested to select one of 2 modes of operation: "walk me" 11*a*—if the user is on a move or "guard me" 11*b*—if, for example, the user is staying at a fixed address during the respective time session of operating the application.

Figure 2:
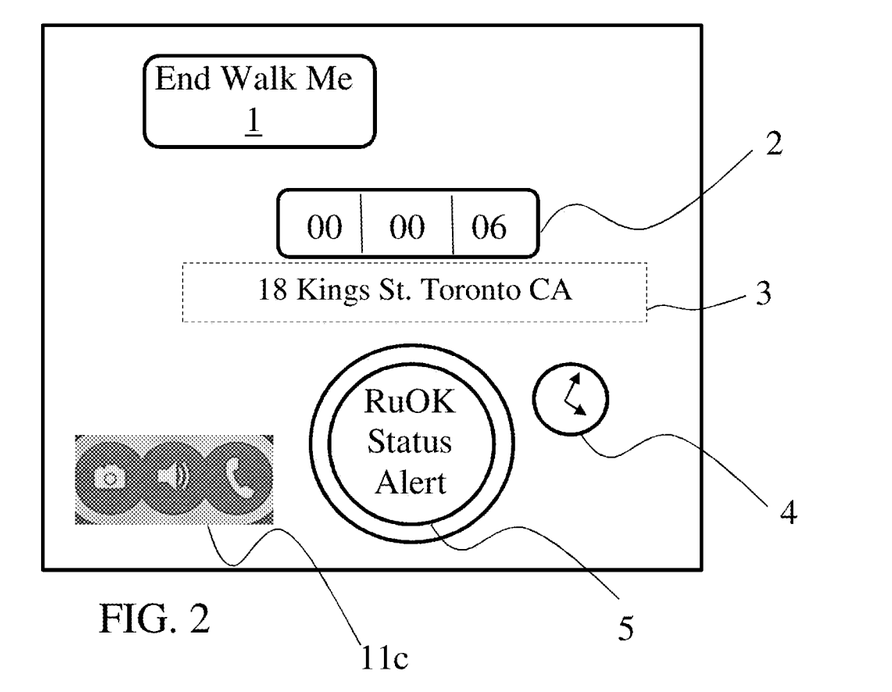
FIG. 2 is an exemplary screen of the mobile application of FIG. 1 in one operation mode according to an embodiment of the present invention.

"Walk Me" Operation Mode:

Referring now to FIG. 2 which is an example screenshot of a mobile application in the walk Me Operation Mode, when the user selected "walk me" mode—a notice may be sent to the server. In addition the location based functionality may be activated and the location of the user/handset may be sent to the server within the time intervals determined by the server and may, according to some embodiments, be converted to an address if the location can be identified as an address at for example Google Maps™. The address 3 may be presented on the main screen, and may be updated within time intervals set by the server. Other methods of user access, and other screenshots, may be used.

Once the "Walk Me" mode is activated—a timer 2 may show the time period of using the "Walk Me" mode.

According to some embodiments, in the "Walk Me" mode of operation, the user may select to activate the RuOK Alert status 5. RuOK Alert status is described below.

"Guard Me" Operation Mode:

If the user selected "guard me" mode (e.g., 11*b* in FIG. 1)—the application may offer user for example four potential options for a fixed address [comment 1 in FIG. 4], as follows (as with other user interface descriptions, other options and other numbers of options may be used):

First Fixed Address inserted by the user in the registration process;
Second Fixed Address inserted by the user in the registration process;

Current location according to location based services; and
Other address to be inserted manually According to some embodiments, the user may insert or input more than one address in the settings screen. For example, two addresses may be provided by the user; for example home address and address of a boyfriend, family member, etc. It should be appreciated that the insertion of addresses may be optional.

According to some embodiments, the user may select one of the four options in order to activate the "Guard Me" mode. The selection of the fixed address may be sent to the Server and may be converted to an address if the location can be identified at an address at, for example, a map service such as Google MapsTM. According to some embodiments, each time the "Guard Me" mode is activated the user may be required to select a fixed address; yet during the respective time of the mode, e.g., upon or in response to activation of the "Guard Me" mode and until user logout from the "Guard Me" mode—the user location will not be updated at the server, whether or not the user changed his location.

Once the "Guard Me" mode has been activated, the user can operate the alarm and the Call Emergency Center functionalities. In both cases the Emergency Center knows the location of the user as specified above. Different modes, and different names of modes, may be used.

"Alarm"

According to some embodiments, the alarm can be activated both in the "guard me" and the "walk me" modes of operation by a single click on the Alarm icon 11*c* (in FIGS. 1 and 2). The Alarm icon may include, according to some embodiments, an illustration of siren, camera and call to reflect the different functionalities.

By activating the alarm, in one embodiment, the following actions may take place (other actions may take place in different embodiments):

Notice may be sent to the server that the alarm was activated;

Siren may be sounded or heard;

Recorded message may be sounded or heard (e.g. following the Siren);

Front and/or back camera of handset 102, may take photographs by for example by rotation between front and back camera and photos may be sent to and saved on server 108 (in FIG. 6).

Automatic dial (without the need for additional click) to the Emergency Call Center (ECC) (e.g. following the recorded message).

According to some embodiments, upon or in response to activation of the alarm, the server may send a notice (e.g. via e-mail or SMS or other system) to the ECC. Accordingly, in case that the automatic call to the ECC is not completed, the ECC may still receive a notice of the activation of the alarm.

"Call Emergency Center"

The "Call Emergency Center" icon can be activated in the "guard me" and "walk me" mode of operations.

By clicking the Call Emergency Center icon—the application will automatically dial to the Emergency Center. This functionality is intended to a situation in which the user does not want to operate all the Alarm functionalities (Siren, recorded message, camera etc. but wish only to contact the Emergency Call Center). In addition a notice will be sent to the server.

The Emergency Center may identify the user based upon his cellular telephone number and verify the identification by asking the user for his identification code (e.g., inserted in the registration process and recorded in the server). The ECC may have a link to the system server.

"Logout"

The logout from any mode of operation of the application, including stopping alarm operation may require, according to some embodiments, the user to insert the OK Password (e.g. a 2 digit code). (The logout icon in the "Walk Me" status is marked "1" in the example provided in FIG. 2 and same icon appears in the "Guard Me" status screen). Once a user user clicks the logout icon, the password screen (FIG. 3) may appear and require the user to insert the OK password. Successful logout may be notified to the server.

Notice from Server to Emergency Call

The Emergency Center can be contacted for example by a call from user or by a notice (email or SMS or other system) from Server to Emergency Center, or another method.

The call can be initiated for example directly by clicking the "Call Emergency Center" icon or by clicking the Alarm icon, in which case the call to the Emergency Center will be initiated automatically (without the need for additional click) following certain Alarm functionalities (e.g., Siren, recorded messages and photos).

According to some embodiments, a notice to ECC may be sent (e.g. via e-mail or SMS) by server, such as server 108 (in FIG. 6) in various scenarios of emergency, such as, for example, cases in which the user may not be able to call the Emergency Center directly or through the Alarm automatic dial. Some exemplary scenarios are provided herein. It should be appreciated that other emergency scenarios may require or result in sending a notice from the server to the ECC.

In the following non-limiting exemplary scenarios, a notice may be sent to the Emergency Center:

Scenario 1—Alarm was activated by user. According to some embodiments of the present invention, when an alarm is activated by a user (e.g. by clicking the alarm icon on mobile device 102) a notice may be sent immediately upon or in response to activating the alarm, so that in the event that the automatic call to the ECC will not be completed, the ECC will be notified of the emergency situation via other communication channels (e.g. via email and/or SMS).

Scenario 2—user is in "Walk Me" mode, activated the RuOK Alert status and inserted an emergency password (see further explanation of RuOK Alert below);

Scenario 3—user is in "Walk Me" mode, has activated the RuOK Alert status and has not inserted the OK password a predefined number (e.g. two, three or the like) of consecutive times (a detailed description of RuOK alert is provided herein below);

Scenario 4—user is in "Walk Me" mode, has activated the RuOK Alert status and inserted an unidentified password, e.g., password that is not defined in the application as an OK password or an emergency password (a detailed description of RuOK alert is provided herein below).

According to some embodiments, notices from server (e.g., 108 in FIG. 6) to ECC may include, for example, user's telephone number, the details of the specific incident (e.g. the scenario that initiated the delivery of the notice, such as, for example, one or more of the scenarios listed above) and the like, It should be appreciated that the specific incident details may be recorded in the server so to enable the ECC to better handle the emergency incident.

Low Battery

According to some embodiments, in case the handset, such as mobile device 102, remaining battery is lower that a predefined value (e.g. , 5%, 10%, remaining work time of less than, for example, 10 minutes and the like) the application may log out automatically. According to some embodiments, prior to logout, a notice (pop up) may be presented to the user, e.g., requesting the user to enter a password, as illustrated, for example in FIG. 3, and a notice may be sent to server and/or to ECC.

RuOK Alert:

According to some embodiments, when the "Walk Me" mode of operation is activated, the mobile application may enable the user to select whether or not to activate an alert (also referred to as RuOK Alert).

According to some embodiments, when the RuOK Alert status is activated, the mobile application may check whether or not the user is OK, within a predefined time interval or time intervals set, for example, by the user According to some embodiments, the time interval(s) may be set during the registration process. In yet other embodiments, the time interval(s) may also be set by user at a later stage through, for example, a setting screen of the mobile application.

According to some embodiments, the time interval(s) can be set or changed through the RuOK Alert status screen by clicking a designated icon such as, for example, the "clock" icon 4 in FIG. 2. Once the RuOK alert status is activated, a notice may be sent to the server (including time interval settings). Once the RuOK Alert status is activated—the mobile application may check whether the user is OK, by showing a screen in which the user is required to feed a password 32 (in FIG. 3) within a predefined time. According to some embodiments, the remaining time 31 to enter password 32 may also be presented to the user.

Figure 3:
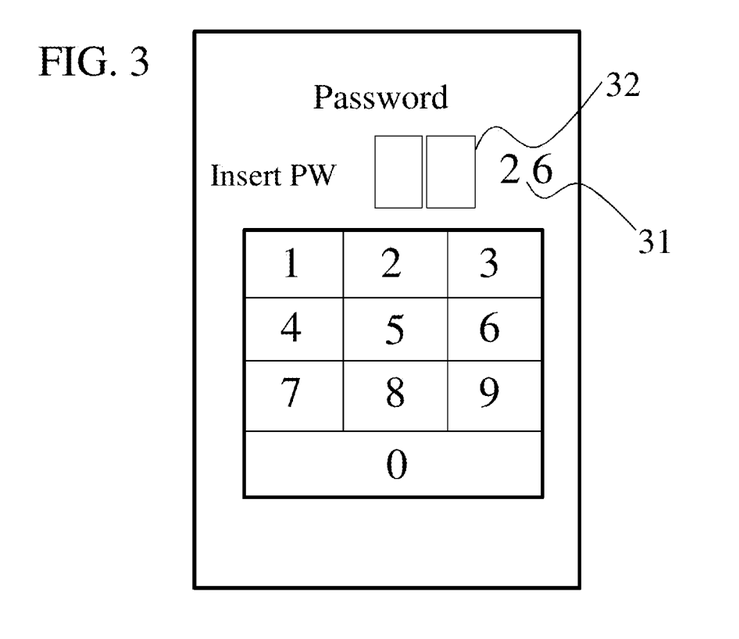
FIG. 3 is an exemplary screen of the mobile application of FIG. 1 in a password screen of a mobile application according to embodiments of the present invention.

According to some embodiments, the user may insert the "OK" password 32 (such as a 2 digit code) or an "Emergency" password 32 (e.g., another 2 digit code).

According to some embodiments, the setting of "OK password" may be obligatory in order for the RuOK Alert functionality to work, while the Emergency password may be at the discretion of the user.

According to some embodiments, in the event that the user has inserted a correct OK password 32, then the application may return to the main "RUOK" screen. The password screen (FIG. 3) may replace the main RuOK screen after the elapse of the next time interval.

For example, if user activated the RuOK Alert on May 23, 2013 at 2:01 AM in the morning and set up a time interval of 1 minute, then on May 23, 2013 at 2:02, the password screen will show up and assuming the user correctly inserted the OK password, then the "Walk Me/RuOK Alert screen" will return and after another minute has elapsed, the password screen may appear or show up again.

According to some embodiments, in the password screen illustrated in FIG. 3, there may be a timer 31 measuring a time period from or since the appearance of password screen. According to some embodiments, timer 31 may count down the seconds or period of time for inserting of the OK Password. For example, a predefined time period may be set in order to enter the OK password 32 by the user, timer 31 may count and present the time remaining to enter password 32. For example, in FIG. 3, timer 31 indicates that 26 seconds are remaining for insertion password 32. According to some embodiments, the counting down timer may be accompanied by beeps or any other vocal indication to refer user's attention to the need to enter password 32 within the required time indicated by timer 31.

In the event that the OK password has not been inserted, or the user has inserted a password that is different from the OK or Emergency passwords (e.g. unidentified password), the system may, according to some embodiments, give the user a second chance to insert the OK password. In the event the OK password has not be inserted after a second opportunity or an unidentified password has been inserted for the second time, the alarm status may be activated (including notice to server and notice by server to the ECC and/or automatic call to the ECC).Thus, according to some embodiments, once the RUOK Alert status has been activated, any damage to the mobile handset 102 may not prevent the system (100 in FIG. 6) from sending a notice to the ECC information of the emergency situation.

According to some embodiments, in the event that an emergency password has been inserted, mobile device 102 (in FIGS. 1 and 6) may appear to operate normally; e.g., as if OK password has been inserted; however the application may notify the server in a "silent" mode (e.g., without activating the alarm functionalities) that the user inserted an emergency password/signaled emergency status and the server may notify the ECC.

According to some embodiments, when network coverage is inconsistent or communication problems are identified (e.g. cellular signal is weak) system 100 may alert user of the potential or actual network coverage problems. The purposes of this alert may be: (i) to avoid false emergency notices due to network coverage issues that prevent from the server to get the OK password notice; (ii) to notify user that server may not receive emergency password and the Emergency Center may not get the Emergency Center Call or Alarm call.

Figure 4:
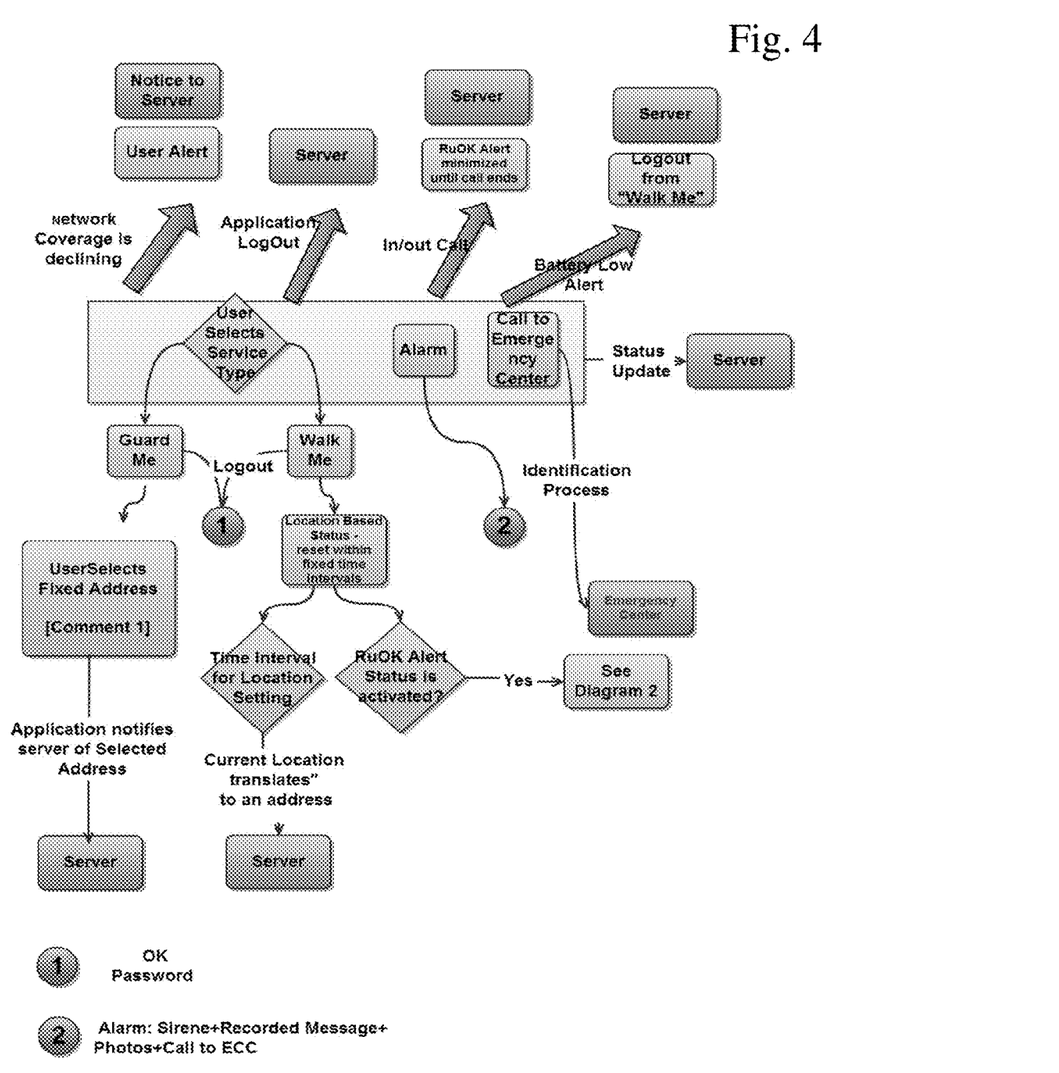
FIGS. 4 and 5 are flowcharts of methods according to embodiments of the present invention in one alert mode.
Figure 5:
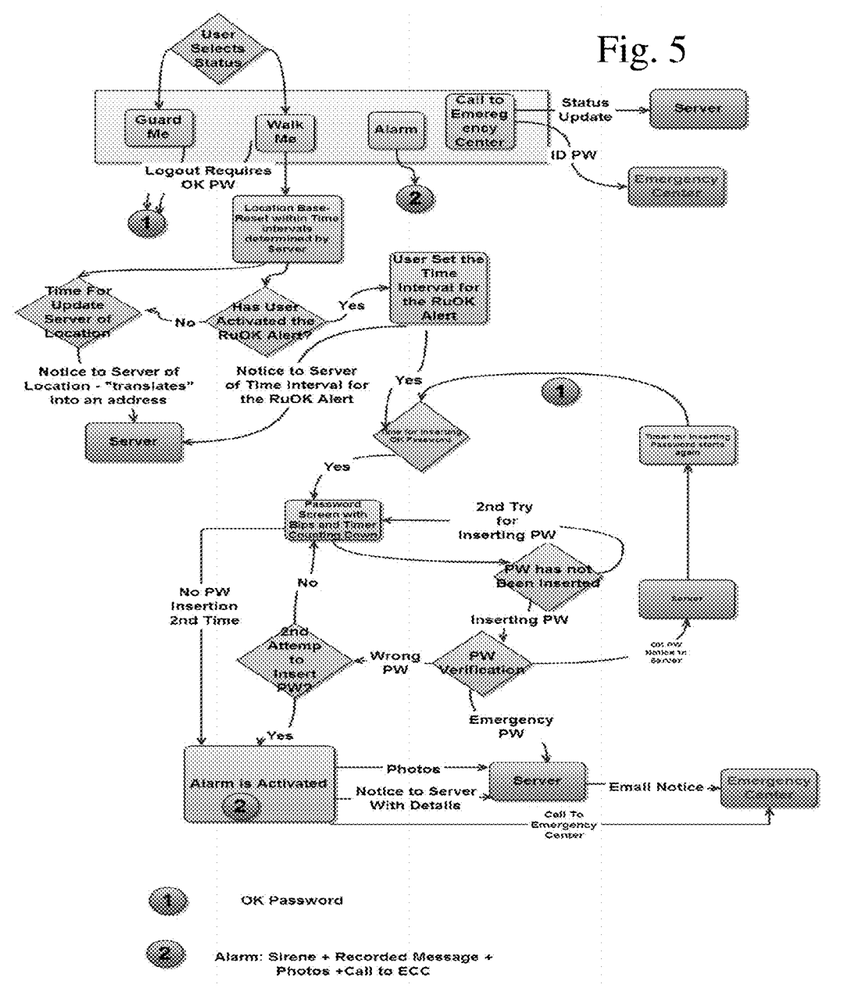

FIGS. 4 and 5 demonstrate flows of systems in the RuOK Alert mode according to embodiments of the present invention. Other operations may be used.

Reference is made to FIG. 6, a system 100 in accordance with an embodiment of the invention. Embodiments of the invention may include a system 100 including a mobile device 102 in communication with a network, such as a cellular network 104, the Internet 106, a WIFI network and/or other networks, one or more servers 108 such as application servers that may include one or more processors 109, one or more databases and/or information storage devices or memories 110, some or all of which may be in communication with network 104 or 106. Device 102 may be or include a cellular telephone, smart phone, tablet computer, laptop computer, network telephone or other device that may communicate over for example wired and/or wireless networks.

Embodiments of the invention may include a system for mobile security monitoring, where the system uses a housing that encompasses a memory, an input device, an audio output device, a visual output device, a wireless transmitter, a wireless receiver and a processor. The processor may be configured to perform methods as discussed herein, for example to receive an activation signal for the security monitoring device, to receive a periodicity interval setting for inputting a security signal to the mobile device, to reset a periodicity interval period if the security input signal is input to the device within a periodicity interval, and to issue an alarm signal if the security input signal is not input to the device within the periodicity interval period.

Device 102 may include a housing, one or more processors 112, one or more memory 114 units, one or more sensors 120, such as physical sensors (location sensors such as Global Positioning System (GPS) sensors, accelerometers, motion sensors, etc.), a clock 113 or other timekeeping monitor, a power source 121, software-based sensors or device sensors (ringer on/ringer off, screen on/screen off, device on/device off), an image capture device(s) such as camera(s) or imagers 107 at for example a front and/or back of the device 102, an electronic display 116 and an input device 118 such as for example a keyboard, microphone, touch screen or other input devices, and an output device 119 such as a speaker, a light or other outputs devices. Processors 109, 112 and other processors may be configured to carry out methods as described herein.

Embodiments of the invention may include machine-readable executable code (such as, personal security monitor 135) contained in a non-transitory storage medium for a computing device, wherein the executable code, when executed by the computing device, causes the computing device to perform a method of the invention. In some embodiments, one or more of the functions performed by processor 109 and other processors discussed herein may be performed by more than one processor, which may be housed remotely from one another. In some embodiments, personal security monitor 135 may be implemented for example by processor 112 executing code or software soterd in memory 114, or may be a physical unit separate from a processor.

In some embodiments, data storage or memories 110 may be housed remotely from one or more devices, and data may be stored in more than one memory 110.

Server 108 may be associated or in communication with one or more security services such as police or other individuals or services suitable to issue or respond to an alarm. Server 108 may be in contact, such as in wireless contact, with device 102 on, for example, a periodic or initiated basis, and may receive and deliver messages to and from device 102.

In operation, an embodiment of the invention may include a personal security system 100 that may be operated by or within device 102, and in contact with server 108. A user or some other operator may activate system 100 and input into device 102 a periodicity interval for a monitoring by the system 100 of the user's personal security. The periodicity interval may for example include a period or lapse of time intervals, upon a termination of which or during which system 100 is to accept or expect the user to check-in or make some input or signal, such as inputting of a pre-defined password to device 102. If such signal or input to device 102 is not made during or upon a termination of the periodicity interval, an alarm may be generated automatically, by default or without further action by the user or input to device 102.

In some embodiments a location of device 102 at one or more periods, such as upon or in response to an activation of system 100, and at some other periods when system 100 is active, may be detected by for example a sensor 120, such as a GPS sensor. Such detected location may be delivered to server 108 and stored. In some embodiments, a second location may be input into device 102 and delivered to server 108, as an indication of for example a terminal point of the user's journey. In some embodiments, one or more of such locations may be identified by way of an automated mapping application such as for example Google Maps™ or some other mapping coordinate function. Sensor 120 may at various intervals automatically deliver a then-current location of device 102 during a journey or period of activation, so that device 102 may be tracked or polled for an OK signal when device 102 arrives at one or more designated locations.

In some embodiments, system 100 and or security monitor 135 may be automatically deactivated when device reaches a pre-designated terminal point of a journey or outing. In some embodiments, a location may be detected and delivered to server 108, and, upon a preselection by a user, an alarm signal may be issued if the user moves away from such detected location during the period when system 100 is active, and unless user inputs a pre-defined password to device 102.

Upon activation or at some other point, a user may input a periodicity interval, such as a particular time during the journey, and end time to the journey or a repeating period during the journey or activation period. The user may also input one or more passwords or designated input signals, and all of such may be transmitted to and stored by server 108. One or more of such passwords may be associated in device 102 or server 108 with a status of the user such as an OK status, an emergency status or other statuses.

One or more of such passwords may be input by a user into device 102 as an indication that the user is OK or safe and that there is no need to issue an alarm. In some embodiments at various times when system 100 is active, an input screen may appear on a display of device 102 requesting the user to respond by for example inputting a password or clicking an emergency button on device 102 to initiate an alarm.

Server 108 may poll device 102 during or at an end of an interval, or in response to detection that device 102 has reached a certain geographical point, or that device 102 has failed to reach a certain geographical point, and to determine if the OK password has been input into and received by device 102. In some embodiments, polling for an OK signal may be initiated based on an elapsed time period, a sensing of motion or lack of motion, or some other event.

A second or other password, or emergency click icon, may be input by user and received by device 102 as an indication that there is a problem or distress with the user and that an alarm signal should be issued. Such a signal may be issued by device 102 itself, and/or by server 108 upon or in response to server's 108 receipt of the distress or alarm signal from device 102. In some embodiments, another password may be designated as a distress password to be input if the user wants to signal that he is being forced to make an input to device 102 under duress. For example, a user may designate a first password or personal security code that is to be input to and received by a device during one or more time intervals as an indication that the user is OK. The user may designate a second or other personal security code that the user may input to the mobile device if the user is in distress and for example threatened by an aggressor to input a password to the device. Upon or in response to inputting such second code, the device may issue only an alarm signal that is inaudible and invisible to the user or from the device 102 or an area around the device 102 so that the aggressor is led to believe that no alarm was triggered and the first code indicating that the user is OK or safe was inserted during the pre-defined interval to avoid the alarm. Such silent, hidden or non-visible, non-audible alarm may include a signal transmitted for example wirelessly to server 108 to indicate that the user is in fact in distress and needs assistance.

In some embodiments, a touch of device 102 by a user on an icon on a screen, on a designated sensor of device 102 or on some other part of device 102 may be predefined as an OK or distress signal.

In some embodiments, server 108 may poll device 102 with a request for device 102 to respond that the OK password has been input during the elapsed period. If server 108 does not receive a response of such OK input within the designated period, an alarm signal may be issued by for example device 102 and/or server 108. In some embodiments, device 102 may issue a signal to server 108 on a periodic basis without being polled by server 108 to indicate that the OK password has been input during the relevant period, or that a distress signal has been input to and received by device 102.

In some embodiments, an alarm signal may be issued by server 108 or device 102 upon or in response to the occurrence of one more of the following: a loss of wireless connectivity by device 102, a damage to, or malfunction of one or more functions of device 102 a deactivation of device 102 or a low battery of device 102. In some embodiments, upon the occurrence of one or more of such events, a request may be transmitted to device 102 asking the user to input an OK signal or indicating that if an OK signal is not received soon (e.g. within a few seconds, minutes or any other predefined time period), then system 100, device 102 or server 108 will issue an alarm. In some embodiments, in response to one or more of such events, or for example if a user fails to input an OK signal at a periodicity interval, server 108, may, instead of issuing an alarm signal, poll device 102, and for example request user to input the OK signal. Such request may be made by way of an appearance of such request on a screen of device 102, or by issuance of an audible signal (beeps, rings or the like) from device 102 as a reminder to the user to input the OK signal.

In some embodiments, system 100 may be programmed to ignore a first missed OK signal upon for example an end of a periodicity interval, and to wait until a second or consecutive OK signal has been missed at the end of a second interval. System 100 may call or otherwise contact device 102 in the period between the first and second periodicity interval to try to remind user to input the OK signal.

In some embodiments, upon the occurrence of an alarm, upon the issuance of an alarm signal or upon a possible indication of distress or emergency by the user or at device 102, one or more of the following functions may be initiated at or from device 102: the telephone or other identification number of device 102 may be sent to server 108 indicating initiation of an alarm sequence, a message may be sent to one or more other devices, a call may be initiated to a security center or other pre-designated services or persons, a location of device 102 may be determined and transmitted to server 108, an image (still or video) may be captured by one or more of the imaging devices, such as camera 107, associated with device 102 and transmitted to server 108, an audio recording may be made by for example a microphone of device 102 and transmitted to server 108, a siren or noise (such as a pre-recorded noise) may be made by device 102, or a flashing light or other visible alarm may be made by device 102. A user may pre-select which of such functions will be activated upon an alarm signal, and may designate a password or input signal to activate some or all of such functions.

In some embodiments, an alarm signal may be followed or preceded by a call or message sent to user or device 102 asking the user to confirm or deny that there is an emergency by, for exampling inputting one or more passwords, calling an emergency center or taking some other action.

Deactivation of system 100 and/or of security monitor 135 may be performed automatically upon the occurrence of some pre-defined event, such as arrival at a geographic location, upon inputting a deactivation password, or upon a user's execution of some other function.

Figure 7:
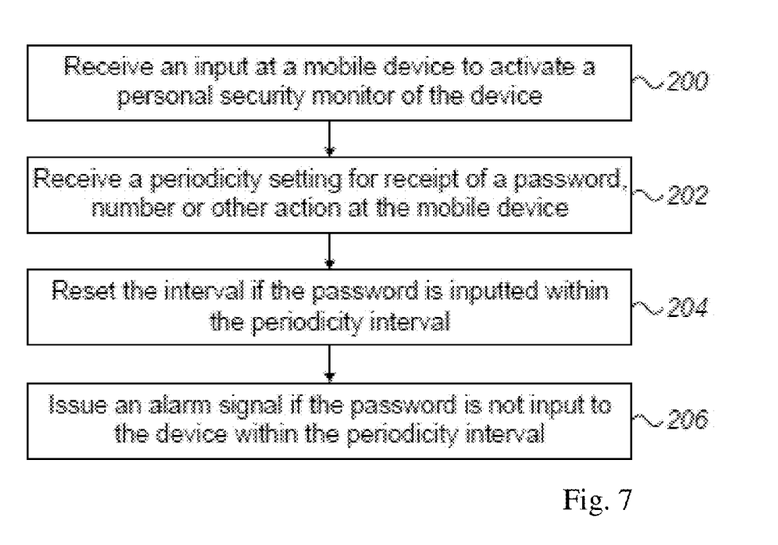
FIG. 7 is a flow diagram in accordance with an embodiment of the invention.

Reference is made to FIG. 7, a flow diagram in accordance with an embodiment of the invention. In block 200 a mobile device may receive an input from for example a user, where such signal includes an activation of the personal security monitor in or with the device. In block 202, the mobile device may receive a signal indicating a periodicity setting for the inputting into the device of a personal security indication, such as a password, number, click or other action taken upon or with the mobile device. In block 204, the periodicity interval may be reset if the security input signal is inputted into the mobile device within the then-ended periodicity interval. In block 206, an alarm signal may be issued if the security input signal is not input into the mobile device within the periodicity interval.

By way of example, upon receipt of an activation signal of the system and a periodicity setting, a device may be activated to expect an inputting of a security signal during or at the end of each period or interval. If the security signal is inputted to, and received by the device during a first period, then the device may at the time of the inputting or at the end of the lapsed interval, reset or begin a new interval, during which a security signal will again be expected to be input into the device. A system may be set to expect a security signal in each, for example, five minute interval during an activation session. A new interval may be reset each five minutes, each time a security signal is received by the device or at some other point. A new interval and an expectation of a next security input signal may be considered a resetting. A receipt and resetting of a new interval may happen once, or may continue for a pre-defined series of intervals, for example until the system and/or security monitor 135 is deactivated or until the occurrence of some other event. A resetting of an interval will be deemed not to occur if for example a security signal is not input during the interval. If no such security input signal is received during an interval, an alarm signal may be issued. For example, if an aggressor grabs, smashes or otherwise deactivates device 102, server 108 may issue an alarm at for example an end of an interval when no signal of an inputted password is received from device 102.

In some embodiments, a location coordinate of the device may be determined, input, stored and transmitted from the device to a server at for example a start of a security monitoring session, and another location may be input, stored or sent to a remote server denoted an expected end to the journey or monitoring session. A periodicity interval may be deemed to be or include one or more locations or time periods between the start of the journey and the end of the journey or security monitoring session, upon which the session or system may be manually or automatically ended.

In some embodiments, issuing an alarm may include wirelessly transmitting an alarm signal from the mobile device to a remote server or receiver. In some embodiments, an alarm signal will be transmitted automatically or by default from a remote device unless a security signal is inputted to the device, and a signal of such input is transmitted to the server.

In some embodiments, a location of the device may be determined or collected during one or more periodicity intervals and, upon an initiation of an alarm sequence, such location may be transmitted to the remote server or device. In some embodiments, location coordinates of device 102 may be collected, recorded and/or transmitted to server 108 on a periodic basis, even without an issuance of an alarm.

In some embodiments, an alarm signal or sequence may trigger one or more of the following actions, functions or responses, an audible alarm signal issued from the mobile device, a visual alarm signal issued from the mobile device, an alarm from a remote device, a call or delivery of a message to another device, a capture of one or more images by the device, and a recording of ambient audio by a microphone of the device. One or more of such actions may be taken at or near a time when a security signal has not been inputted into the device or an indication of such inputting has not been received by the remote server.

In some embodiments a user may input to the mobile device a location coordinate and a time associated with the location coordinate, and the periodicity interval may be deemed to be the arrival of the device at such location within such time. If the device does not arrive at such location within such time, the alarm signal may be issued. In some embodiments, an audible or visual signal may be issued at or from the mobile device as a reminder to a user to input the security input signal or password at a time at or near the end of a periodicity interval or at some other point.

In some embodiments, an alarm signal may be issued upon an inputting into the mobile device of an alternate security input signal, such as pressing an emergency icon on a screen of the device or inputting another password indicating an emergency.

In some embodiments, an alarm signal may not be issued if only one or some other number of intervals or time periods are passed without an inputting into the device or receipt by the device of a security code or password. In such cases, a signal may ignore a first expected input of a security code that was not received, and for example issue a request or reminder to put in the code before a second interval is passed. In one embodiment the alarm signal may not be sent until there are for example two or more, expected inputs that are missed. An alarm signal may be issued if for example the device loses connectivity, is damaged, has a low battery, is deactivated or some other action or function of the device is activated or deactivated. In some of such cases, a warning or signal may be sent to the device to warn the user that an alarm signal will be sent unless an input is made to the device following the occurrence of one or more of such events.

Figure 8:
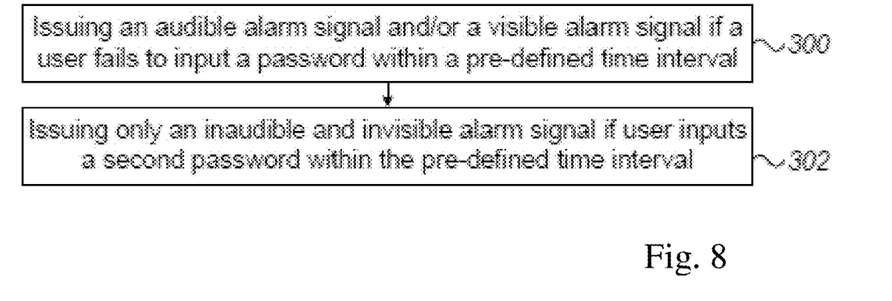
FIG. 8 is a flow diagram in accordance with an embodiment of the invention.

Reference is made to FIG. 8, a flow diagram in accordance with an embodiment of the invention. An embodiment may include a method for selecting an alarm to be issued from a personal security system of a mobile device. In block 300, there may be issued one or more of an audible alarm signal and a visible alarm signal from the mobile device if a user fails to input a designated personal security signal, such as a first password to the mobile device within a pre-defined time interval. A wireless signal may also be issued to a remote server upon such failure to input the password. In block 302, the mobile device may issue only an alarm signal that is inaudible and invisible in the event that a second pre-designated personal security signal is input to it within the pre-defined time interval. Such inaudible and invisible signal (e.g., an electronic mail, an SMS and the like) may be transmitted to a remote processor. Thus the signal may be audible or "visible" to an electronic receiving device, but may not be audible or visible to an unaided human.

In some embodiments, a mobile device may display a request to input at least one of the first password and the second password.

While certain features of the invention have been illustrated and described herein, many modifications, substitutions, changes, and equivalents will occur to those of ordinary skill in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of implementing a personal security monitor on a mobile device, the method comprising:
    receiving at said mobile device an activation signal for said personal security monitor;
    receiving at said mobile device a periodicity setting for a security signal input to said mobile device;
    resetting a periodicity interval if said security input signal is input to said mobile device within said periodicity interval; and
    issuing an alarm signal if said security input signal is not input to said mobile device within said periodicity interval.

2. The method as in claim 1, comprising:
    receiving by said mobile device a location coordinate,
    deactivating said personal security monitor upon an arrival of said mobile device at said location coordinate.

3. The method as in claim 1, wherein said issuing an alarm comprises wirelessly transmitting said alarm signal from said mobile device to a remote receiver.

4. The method as in claim 1, comprising wirelessly transmitting a location coordinate of said mobile device to a remote server if said security input signal is not input to said mobile device within said periodicity interval.

5. The method as in claim 1, wherein said issuing an alarm comprises issuing said alarm, said alarm selected from the group consisting of an audible alarm signal from said mobile device, a visual alarm signal from said mobile device, a wireless alarm signal from said remote device.

6. The method as in claim 1, comprising:
    receiving by said mobile device a location coordinate and a time associated with said location coordinate; and
    issuing said alarm signal if said mobile device fails to arrive at said location prior to said time.

7. The method as in claim 1, comprising issuing said alarm signal upon an input to said mobile device of an alternate security input signal.

8. The method as in claim 1, comprising issuing an audible signal from said mobile device, said audible signal associated with a reminder to input said security input signal to said mobile device, said audible signal issued at a time associated with said periodicity interval.

9. The method as in claim 1, comprising capturing an image with an imager of said mobile device if said security input signal is not input to said mobile device within said periodicity interval period.

10. The method as in claim 1, comprising recording ambient sound with a microphone of said mobile device if said security input signal is not input to said mobile device within said periodicity interval.

11. The method as in claim 1, wherein said issuing an alarm signal if said security input signal is not input to said mobile device within said periodicity interval period, comprises issuing said alarm signal if said security input signal is not input within a plurality of said periodicity intervals.

12. The method as in claim 1, comprising issuing said alarm signal upon a cessation in an operation of a pre-designated function of said mobile device.

13. The method as in claim 1, comprising issuing an alarm upon a detection of a loss of connectivity to a wireless network by said mobile device.

14. The method as in claim 1, comprising issuing a signal from said mobile device to a remote server upon a detection that a power source of said mobile device is low on power.

15. The method as in claim 1, wherein said alarm signal is issued from a remote server unless said signal associated with security input signal is received at said remote server.

16. The method as in claim 1, wherein issuing said alarm signal, comprises issuing an alarm signal to a remote server and not activating an audible or visible alarm at said mobile device, if said security input signal is not input to said mobile device within said periodicity interval and if another pre-defined security input signal is input to said mobile device.

17. A mobile security monitoring device, comprising
a mobile housing, said housing encompassing:
   a memory;
   an input device;
   an audio output device;
   a visual output device;
   a wireless transmitter;
   a wireless receiver; and
   a processor, said processor configured to:
receive an activation signal for said security monitoring device;
receive a periodicity interval setting for a security signal input to said security monitoring device;
reset a periodicity interval period if said security input signal is input to security monitoring device within a periodicity interval;
issue an alarm signal if said security input signal is not input to security monitoring device within said periodicity interval period.

18. The device as in claim 17, wherein said housing comprises a geographic location sensor, and wherein said processor is configured to record a location coordinate and a time associated with said location coordinate; and
   to issue said alarm signal if said mobile security monitoring device fails to arrive at said location prior to said time.

19. A method for selecting an alarm to be issued from a personal security system in a mobile device, the method comprising:
issuing at least one of an audible alarm signal and a visible alarm signal from said mobile device if a first personal security signal is not input to said mobile device within a pre-defined time interval;
issuing from said mobile device only an alarm signal that is inaudible and invisible from said personal device if a second personal security signal is input to said mobile within said pre-defined time interval, said alarm signal that is inaudible and invisible at said personal device, transmitted to a remote processor.

20. The method as in claim 19, comprising displaying on said mobile device a request to input at least one of said first person security signal and said second personal security signal.

* * * * *